(12) United States Patent
Hawkins (10) Patent No.: US 8,256,452 B2
(45) Date of Patent: Sep. 4, 2012

(54) GAS REGULATOR FLOW BOOST CARTRIDGE

(75) Inventor: James C. Hawkins, Allen, TX (US)

(73) Assignee: Fisher Controls International LLC, Marshalltown, IA (US)

( * ) Notice: Subject to any disclaimer, the term of this patent is extended or adjusted under 35 U.S.C. 154(b) by 651 days.

(21) Appl. No.: 12/105,737

(22) Filed: Apr. 18, 2008

(65) Prior Publication Data

US 2008/0258096 A1 Oct. 23, 2008

Related U.S. Application Data

(60) Provisional application No. 60/913,115, filed on Apr. 20, 2007, provisional application No. 60/913,109, filed on Apr. 20, 2007, provisional application No. 60/913,135, filed on Apr. 20, 2007.

(51) Int. Cl.
*F16K 31/36* (2006.01)
(52) U.S. Cl. .................. 137/505.46; 251/58; 251/335.2
(58) Field of Classification Search ............ 251/58, 251/335.2, 366, 367, 61, 62, 118–127, 357, 251/358; 137/505.46, 505.47, 477, 613
See application file for complete search history.

(56) References Cited

U.S. PATENT DOCUMENTS

| | | |
|---|---|---|
| 836,258 A | 11/1906 | Hubner et al. |
| 1,166,027 A | 12/1915 | Weisgerber et al. |
| 1,262,225 A | 4/1918 | Meyer |
| 1,918,602 A | 7/1933 | Joyce |
| 1,973,744 A | 9/1934 | Brown |
| 2,173,707 A | 9/1939 | Brown |
| 2,192,327 A | 3/1940 | Palmer |
| 2,215,419 A | 9/1940 | Cheeseman |
| 2,263,581 A | 11/1941 | Hughes |
| 2,315,370 A | 3/1943 | Hughes |
| 2,522,732 A | 9/1950 | Fairchild |
| 2,619,983 A | 12/1952 | Roberts |

(Continued)

FOREIGN PATENT DOCUMENTS

DE 37 14 065 A1 10/1987

(Continued)

OTHER PUBLICATIONS

Australian Office Action for Application No. 2008242777, dated Nov. 29, 2010.

(Continued)

*Primary Examiner* — John K Fristoe, Jr.
*Assistant Examiner* — Marina Tietjen
(74) *Attorney, Agent, or Firm* — Marshall, Gerstein & Borun LLP (57) ABSTRACT

A gas regulator includes an actuator, a valve, and a cartridge disposed within the valve to advantageously direct, or "boost," fluid downstream and away from the actuator under normal operating conditions, thereby increasing the operating efficiency of the regulator. The cartridge includes a first portion with a first diameter and a second portion with a second diameter that is greater than the first diameter. During normal operation, the first portion receives a valve disc of the actuator within generally tight tolerances such that the valve disc and the cartridge restrict fluid communication between the valve and the actuator. This directs or "boosts" the gas toward the outlet of the valve. Additionally, during a relief operation, the second portion of the cartridge receives the valve disc to allow the free flow of gas to the actuator.

32 Claims, 7 Drawing Sheets

U.S. PATENT DOCUMENTS

| | | | |
|---|---|---|---|
| 2,688,980 A | 9/1954 | Pool | |
| 2,826,213 A | 3/1958 | Wright | |
| 2,827,069 A * | 3/1958 | Peterson | 137/116.5 |
| 2,869,575 A | 1/1959 | Hutchens | |
| 2,895,501 A * | 7/1959 | Irwin | 137/484.4 |
| 2,951,494 A | 9/1960 | Holmes | |
| 3,001,545 A | 9/1961 | Ziege | |
| 3,160,169 A | 12/1964 | Peterson | |
| 3,228,417 A | 1/1966 | Schwerter | |
| 3,386,465 A | 6/1968 | Johnson | |
| 3,392,749 A * | 7/1968 | Gneiding et al. | 137/484.6 |
| 3,420,257 A | 1/1969 | Lansky et al. | |
| 3,425,442 A | 2/1969 | Johnson et al. | |
| 3,488,685 A | 1/1970 | Hughes | |
| 3,525,356 A | 8/1970 | Johnson et al. | |
| 3,572,372 A | 3/1971 | Moore | |
| 3,580,271 A | 5/1971 | Farrer | |
| 3,599,658 A | 8/1971 | Kruzan et al. | |
| 3,613,725 A | 10/1971 | Hughes | |
| 3,621,867 A | 11/1971 | Johnson | |
| 3,623,506 A | 11/1971 | Bonner et al. | |
| 3,658,082 A | 4/1972 | DiTirro | |
| 3,705,599 A | 12/1972 | Sheward | |
| 3,722,536 A | 3/1973 | Hill et al. | |
| 3,754,570 A | 8/1973 | Hughes | |
| 3,809,108 A | 5/1974 | Hughes | |
| RE28,447 E | 6/1975 | Bonner et al. | |
| 3,892,255 A | 7/1975 | Johnson | |
| 3,971,410 A | 7/1976 | St. Clair | |
| 4,019,531 A | 4/1977 | Johnson | |
| 4,067,354 A | 1/1978 | St. Clair | |
| 4,067,355 A | 1/1978 | St. Clair | |
| 4,069,839 A | 1/1978 | Hughes | |
| 4,129,145 A | 12/1978 | Wynn | |
| 4,176,677 A | 12/1979 | Hughes | |
| 4,195,656 A | 4/1980 | Kanerva et al. | |
| 4,485,843 A | 12/1984 | Wolff | |
| 4,505,292 A | 3/1985 | Osterode | |
| 4,679,592 A | 7/1987 | Lamb | |
| 4,754,778 A | 7/1988 | Duffy et al. | |
| 4,842,013 A | 6/1989 | Rice et al. | |
| 4,889,158 A | 12/1989 | Rice et al. | |
| 4,972,868 A | 11/1990 | Davis et al. | |
| 4,972,871 A | 11/1990 | Rice et al. | |
| 5,007,614 A | 4/1991 | Lockwood, Jr. | |
| 5,176,148 A | 1/1993 | Wiest et al. | |
| 5,697,398 A | 12/1997 | Gidney et al. | |
| 5,881,765 A | 3/1999 | Turney et al. | |
| 5,887,853 A | 3/1999 | Holmes et al. | |
| 6,167,905 B1 | 1/2001 | Malloy et al. | |
| 6,321,166 B1 | 11/2001 | Evans et al. | |
| 6,422,260 B2 | 7/2002 | Danowski et al. | |
| 7,537,194 B2 | 5/2009 | Nagai | |
| 2004/0187930 A1 | 9/2004 | Hawkins et al. | |
| 2005/0106952 A1 | 5/2005 | Maxwell et al. | |
| 2006/0065307 A1 | 3/2006 | Schmidt et al. | |
| 2008/0031755 A1 | 2/2008 | Pekar | |
| 2008/0257427 A1 | 10/2008 | Zhang et al. | |

FOREIGN PATENT DOCUMENTS

| | | |
|---|---|---|
| DE | 295 06 395 U1 | 6/1995 |
| EP | 0 277 869 A1 | 8/1988 |
| GB | 0 966 346 A | 8/1964 |
| GB | 1 220 467 A | 1/1971 |
| GB | 2 024 996 A | 1/1980 |
| WO | WO-02/093284 A1 | 11/2002 |

OTHER PUBLICATIONS

European Office Action for Application No. 08746291.7, dated Mar. 15, 2010.
Actaris Metering Systems, "CL34 Series Commerical Regulator, Advanced Metering and Regulation Technology at Work," pp. 1-12 (2001).
Actaris Metering Systems, "B38 Series Commerical & Industrial Regulator, Advanced Metering and Regulation Technology at Work," pp. 1-28 (2002).
Acraris Metering Systems, "Gas Regulation Overview," pp. 1-16 (2004).
Actaris Metering Systems, "Regulator Loading Ring Instructions," pp. 1-2 (1996).
Emerson Process Management, "Y600A Series Pressure Reducing Regulators," Instruction Manual Form 5458, pp. 1-8 (2008).
Fisher-Rosemount, "Type Y600A Series Pressure Reducing Regulators. More Versatile Than Ever Before" pp. 1-2 (1998).
Schlumberger Gas, "CL-38 Series Constant Loaded Regulators," Data Sheet, pp. 1-8 (1997).
International Search Report for PCT/US2008/060846, mailed Aug. 6, 2008.
Written Opinion of the International Searching Authority for PCT/US2008/060846, mailed Aug. 6, 2008.
Office Action for Chinese Patent Application No. 200880012623.3, dated Dec. 21, 2010.
Office Action for Chinese Patent Application No. 200880011137.X, dated Dec. 27, 2010.
Australian Office Action for Application No. 2008242775, dated Nov. 16, 2010.
European Office Action for Application No. 08746287.5-2206, dated Mar. 15, 2010.
European Office Action for Application No. 08746310.5, dated Mar. 16, 2010.
International Preliminary Report on Patentability for Application No. PCT/US2008/060842, dated Oct. 20, 2009.
International Preliminary Report on Patentability for Application No. PCT/US2008/060846, dated Oct. 20, 2009.
International Preliminary Report on Patentability for Application No. PCT/US2008/060872, dated Oct. 20, 2009.
International Search Report for Application No. PCT/US2008/060842, dated Jul. 29, 2008.
International Search Report for Application No. PCT/US2008/060872, dated Aug. 5, 2008.
Office Action for Chinese Application No. 200880012891.5, dated Apr. 15, 2011.
Written Opinion for Application No. PCT/US2008/060842, dated Jul. 29, 2008.
Written Opinion for Application No. PCT/US2008/060872, dated Aug. 5, 2008.
Australian Office Action for Application No. 2008242690, dated Mar. 10, 2011.
Australian Office Action for Application No. 2008242692, dated Feb. 22, 2011.
European Examination Report for Application No. 08746301.4, Jan. 20, 2011.
First Chinese Office Action for Application No. 200880011104.5, dated Apr. 20, 2011.
First Office Action for Chinese Application No. 200880011630.1, dated Feb. 24, 2011.
International Preliminary Report on Patentability for Application No. PCT/US2008/060857, dated Oct. 20, 2009.
International Preliminary Report on Patentability for Application No. PCT/US2008/060860, dated Oct. 20, 2009.
International Search Report for Application No. PCT/US2008/060862, dated Aug. 5, 2008.
International Search Report for Application No. PCT/US2008/060857, dated Aug. 1, 2008.
International Search Report for Application No. PCT/US2008/060860, dated Aug. 5, 2008.
Written Opinion for Application No. PCT/US2008/060857, dated Aug. 1, 2008.
Written Opinion for Application No. PCT/US2008/060860, dated Aug. 5, 2008.
Written Opinion for Application No. PCT/US2008/060862, dated Aug. 5, 2008.
European Examination Report for Application No. 08746310.5, dated Aug. 8, 2011.
First Chinese Office Action for Application No. 200880009704.8, dated May 31, 2011.
First Chinese Office Action for Application No. 200880011778.5, dated Jun. 21, 2011.

Office Action for Gulf Corporation Council Application No. GCC/P/2008/10630, dated Jul. 2, 2011.
Office Action for Australian Application No. 2008242699, dated Sep. 22, 2011.
Second Chinese Office Action for Application No. 200880011137.X, dated Sep. 1, 2011.
Second Office Action for Chinese Application No. 200880012623.3, dated Nov. 9, 2011.
Office Action for Gulf Cooperation Council Application No. GCC/P/2008/10631, dated Sep. 19, 2011.
Russian Office Action for Application No. 2009139833/28(056527), dated Jan. 23, 2012.
Extended European Search Report for Application No. 12160711.3, dated Apr. 26, 2012.
Extended European Search Report for Application No. 12158736.4, dated May 2, 2012.
Extended European Search Report for Application No. 12160527.3, dated Apr. 30, 2012.

* cited by examiner

GAS REGULATOR FLOW BOOST CARTRIDGE

CROSS-REFERENCE TO RELATED APPLICATIONS

The priority benefit of each of the following U.S. Provisional Patent Applications is claimed: 60/913,115, filed Apr. 20, 2007; 60/913,109, filed Apr. 20, 2007; and 60/913,135, filed Apr. 20, 2007, the entire contents of each of which are hereby incorporated herein by reference.

FIELD OF THE INVENTION

The present invention relates to gas regulators, and more particularly, to gas regulators having actuators with closed-loop control.

BACKGROUND

The pressure at which typical gas distribution systems supply gas may vary according to the demands placed on the system, the climate, the source of supply, and/or other factors. However, most end-user facilities equipped with gas appliances such as furnaces, ovens, etc., require the gas to be delivered in accordance with a predetermined pressure, and at or below a maximum capacity of a gas regulator. Therefore, gas regulators are implemented into these distribution systems to ensure that the delivered gas meets the requirements of the end-user facilities. Conventional gas regulators generally include a closed-loop control actuator for sensing and controlling the pressure of the delivered gas.

In addition to a closed loop control, some conventional gas regulators include a relief valve. The relief valve is adapted to provide over pressure protection when the regulator or some other component of the fluid distribution system fails, for example. Accordingly, in the event the delivery pressure rises above a predetermined threshold pressure, the relief valve opens to exhaust at least a portion of the gas to the atmosphere, thereby reducing the pressure in the system.

Figure 1:
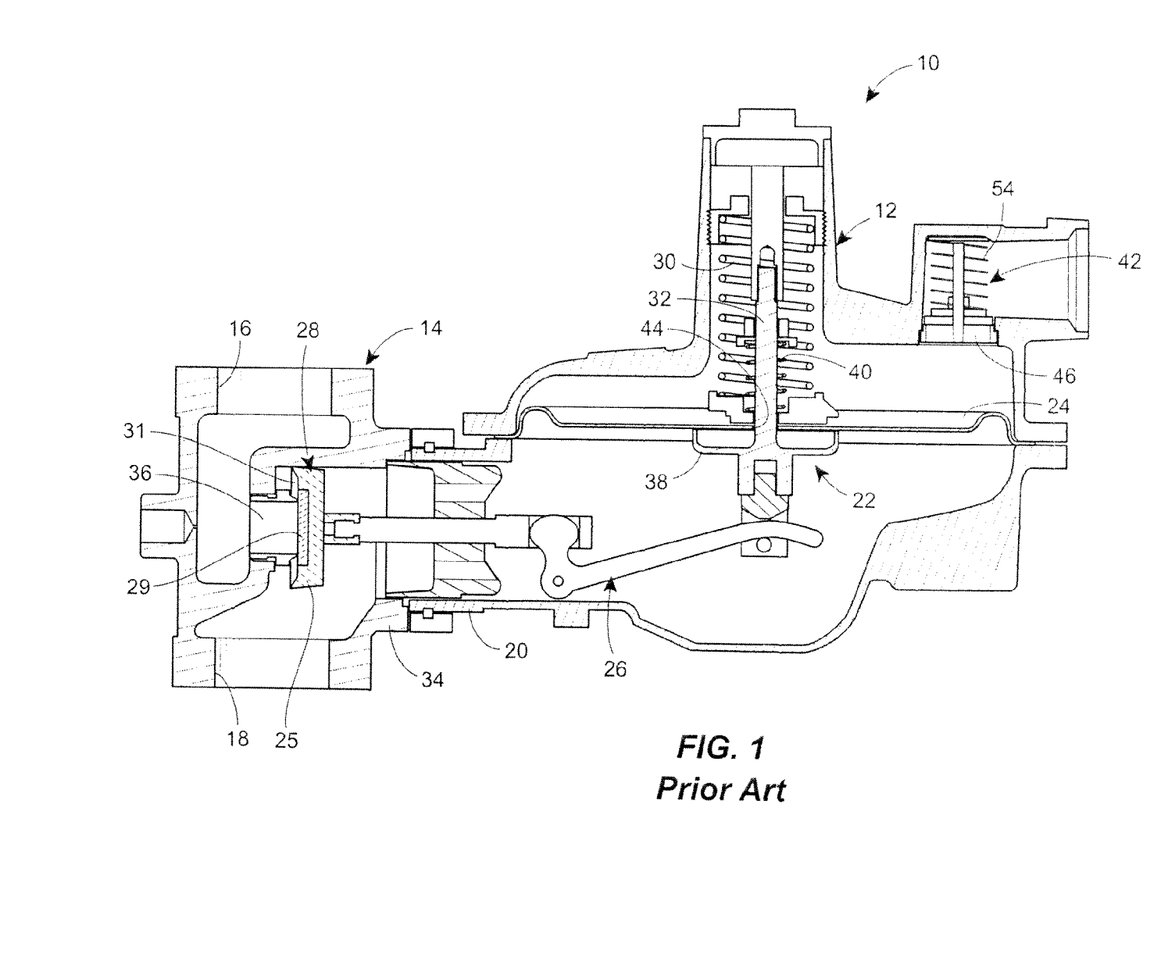
FIG. 1 is a side cross-sectional view of a conventional regulator.
Figure 1A:
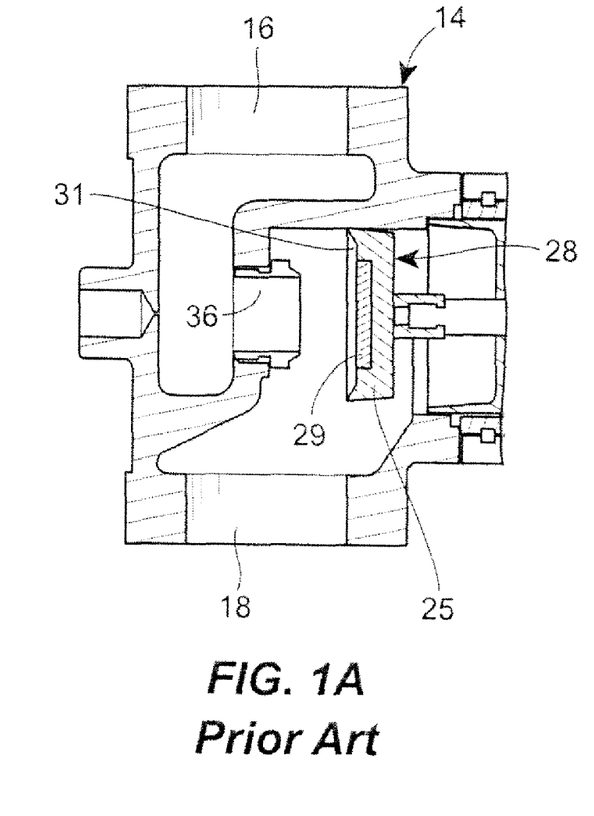
FIG. 1A is a side cross-sectional view of a regulator valve of the regulator of FIG. 1.

FIGS. 1 and 1A depict one conventional gas regulator 10. The regulator 10 generally comprises an actuator 12 and a regulator valve 14. The regulator valve 14 defines an inlet 16 for receiving gas from a gas distribution system, for example, and an outlet 18 for delivering gas to an end-user facility such as a factory, a restaurant, an apartment building, etc. having one or more appliances, for example. Additionally, the regulator valve 14 includes a valve port 36 disposed between the inlet and the outlet. Gas must pass through the valve port 36 to travel between the inlet 16 and the outlet 18 of the regulator valve 14.

The actuator 12 is coupled to the regulator valve 14 to ensure that the pressure at the outlet 18 of the regulator valve 14, i.e., the outlet pressure, is in accordance with a desired outlet or control pressure. The actuator 12 is therefore in fluid communication with the regulator valve 14 via a valve mouth 34 and an actuator mouth 20. The actuator 12 includes a control assembly 22 for sensing and regulating the outlet pressure of the regulator valve 14. Specifically, the control assembly 22 includes a diaphragm 24, a piston 32, and a control arm 26 having a valve disc 28. The conventional valve disc 28 includes a generally cylindrical body 25 and a sealing insert 29 fixed to the body 25. The valve body 25 may also include a circumferential flange 31 integrally formed therewith, as depicted in FIG. 1A. The diaphragm 24 senses the outlet pressure of the regulator valve 14. The control assembly 22 further includes a control spring 30 in engagement with a top-side of the diaphragm 24 to offset the sensed outlet pressure. Accordingly, the desired outlet pressure, which may also be referred to as the control pressure, is set by the selection of the control spring 30.

The diaphragm 24 is operably coupled to the control arm 26, and therefore, the valve disc 28 via the piston 32, controls the opening of the regulator valve 14 based on the sensed outlet pressure. For example, when an end user operates an appliance, such as a furnace, for example, that places a demand on the gas distribution system downstream of the regulator 10, the outlet flow increases, thereby decreasing the outlet pressure. Accordingly, the diaphragm 24 senses this decreased outlet pressure. This allows the control spring 30 to expand and move the piston 32 and the right-side of the control arm 26 downward, relative to the orientation of FIG. 1. This displacement of the control arm 26 moves the valve disc 28 away from the valve port 36 to open the regulator valve 14. FIG. 1A depicts the valve disc 28 in a normal, open operating position. So configured, the appliance may draw gas through the valve port 36 toward the outlet 18 of the regulator valve 14.

In the conventional regulator 10, the control spring 30 inherently generates less force as it expands towards an uncompressed length when displacing the control arm 26 to open the valve port 36. Additionally, as the control spring 30 expands, the diaphragm 24 deforms, which increases the area of the diaphragm 24. The decreased force supplied by the control spring 30 and the increased area of the diaphragm 24 in this operational scenario combine to create a regulator response wherein the force provided by the control spring 30 cannot adequately balance the force generated by the diaphragm 24 thereby resulting in an outlet control pressure that is less than that originally set by the user. This phenomenon is known as "droop." When "droop" occurs, the outlet pressure decreases below its set control pressure and the regulator 10 may not function as intended.

Figure 2:
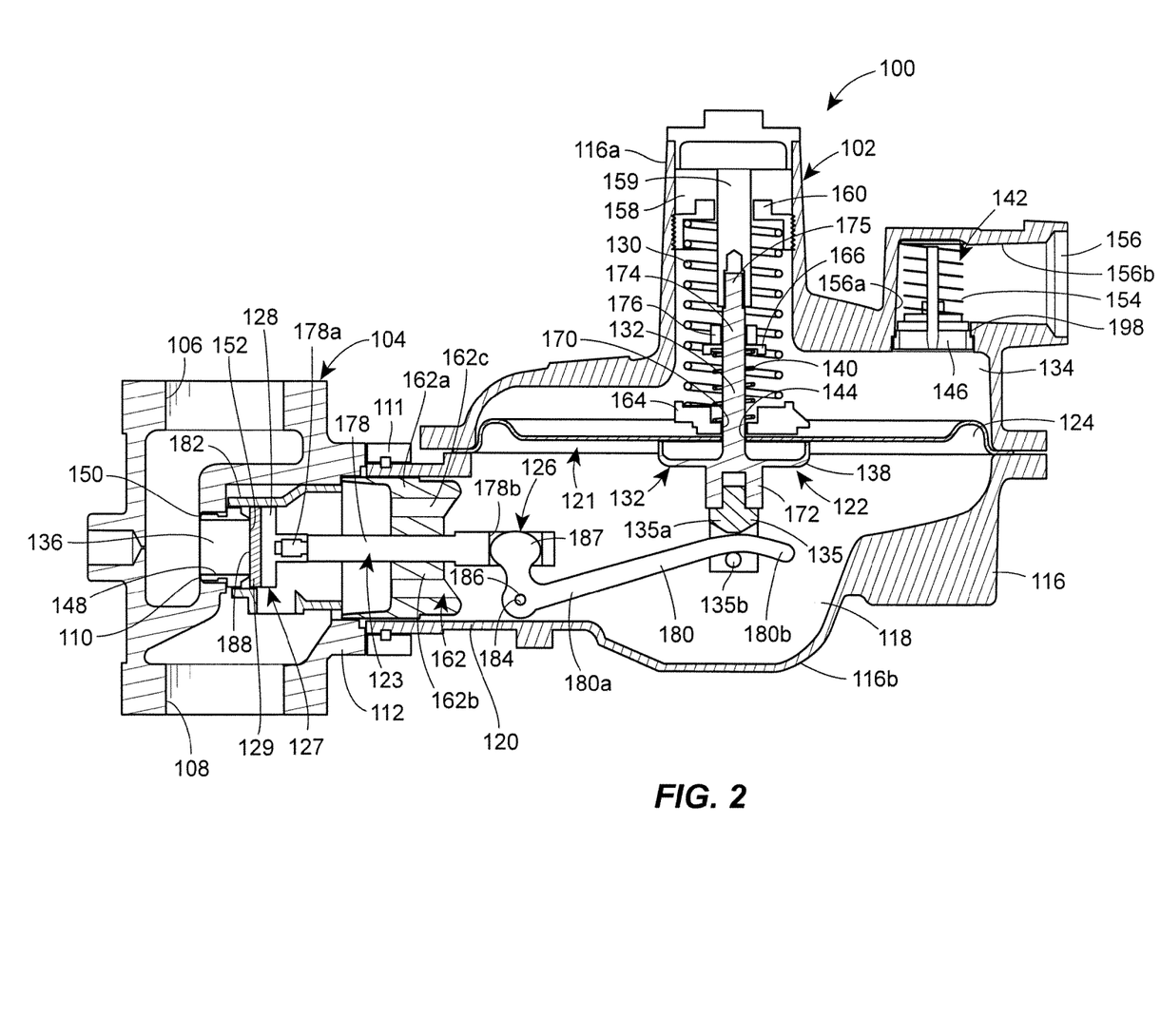
FIG. 2 is a side cross-sectional view of a regulator constructed in accordance with one embodiment of the present invention showing the valve disc in a closed position.

In the conventional regulator 10 depicted in FIG. 1, the control assembly 22 further functions as a relief valve, as mentioned above. Specifically, the control assembly 22 also includes a relief spring 40 and a release valve 42. The diaphragm 24 includes an opening 44 through a central portion thereof and the piston 32 includes a sealing cup 38. The relief spring 40 is disposed between the piston 32 and the diaphragm 24 to bias the diaphragm 24 against the sealing cup 38 to close the opening 44, during normal operation. Upon the occurrence of a failure such as a break in the control arm 26, the control assembly 22 is no longer in direct control of the valve disc 28 and inlet flow will move the valve disc 28 will move into an extreme open position. This allows a maximum amount of gas to flow into the actuator 12. Thus, as the gas fills the actuator 12, pressure builds against the diaphragm 24 forcing the diaphragm 24 away from the sealing cup 38, thereby exposing the opening 44. The gas therefore flows through the opening 44 in the diaphragm 24 and toward the release valve 42. The release valve 42 includes a valve plug 46 and a release spring 54 biasing the valve plug 46 into a closed position, as depicted in FIG. 2. Upon the pressure within the actuator 12 and adjacent the release valve 42 reaching a predetermined threshold pressure, the valve plug 46 displaces upward against the bias of the release spring 54 and opens, thereby exhausting gas into the atmosphere and reducing the pressure in the regulator 10.

When selecting a regulator for use in a particular application, technicians are charged with the task of maximizing flow capacity at the set control pressure while minimizing the amount of gas exhausted to the atmosphere under failure conditions. Typically, this task is accomplished by designing or selecting various aspects of the regulator 10, such as the valve port, to afford some compromise between these competing interests. In order to limit the amount of gas released to the atmosphere by the relief valve, technicians often choose the smallest port available to meet the required flow capacity.

SUMMARY

The present invention provides a regulator comprising a regulator valve and an actuator. The regulator valve comprises a valve body and a cartridge. The valve body has an inlet and an outlet. The actuator is coupled to the valve body and comprises a control element including a valve disc. The valve disc is slidably disposed within the valve body and adapted for displacement between a closed position and an open position. The cartridge is carried within the valve body and comprises a generally hollow cylindrical member having an aperture through a side thereof. More specifically, the cartridge includes a first portion comprising a sidewall of a first diameter, and a second portion comprising a sidewall of a second diameter that is larger than the first diameter. Additionally, in one embodiment, a transition portion that is generally frustoconical extends between the first and second portions. The aperture of one embodiment is disposed through the first portion of the cartridge and directed toward the outlet of the valve.

In a further aspect of the regulator, the valve body includes a mouth defining an opening that is perpendicular to the inlet and the outlet. In this embodiment, the second portion of the cartridge is carried within the opening of the mouth.

Additionally, at least in one embodiment, the second portion of the cartridge may be removably carried within the opening of the mouth.

In another embodiment, the cartridge may include a conduit portion disposed adjacent the aperture for directing fluid toward the outlet of the valve body.

Another embodiment of the present invention includes a cartridge for use with a gas regulator having a regulator valve of an actuator connected to a mouth of the regulator valve. The cartridge is adapted for directing the flow of a fluid through the regulator toward an outlet of the regulator valve and away from the actuator during a first or normal operational mode. One embodiment of the cartridge comprises first and second portions, an opening, and an inlet. The first portion has a first diameter. The second portion is axially aligned with the first portion and has a second diameter that is greater than the first diameter. The second portion is adapted to be carried by the mouth of the regulator valve. The opening is disposed through the first portion such that when the cartridge is installed in the gas regulator, the opening directs fluid flowing through the regulator valve toward the outlet.

DETAILED DESCRIPTION

Figure 3:
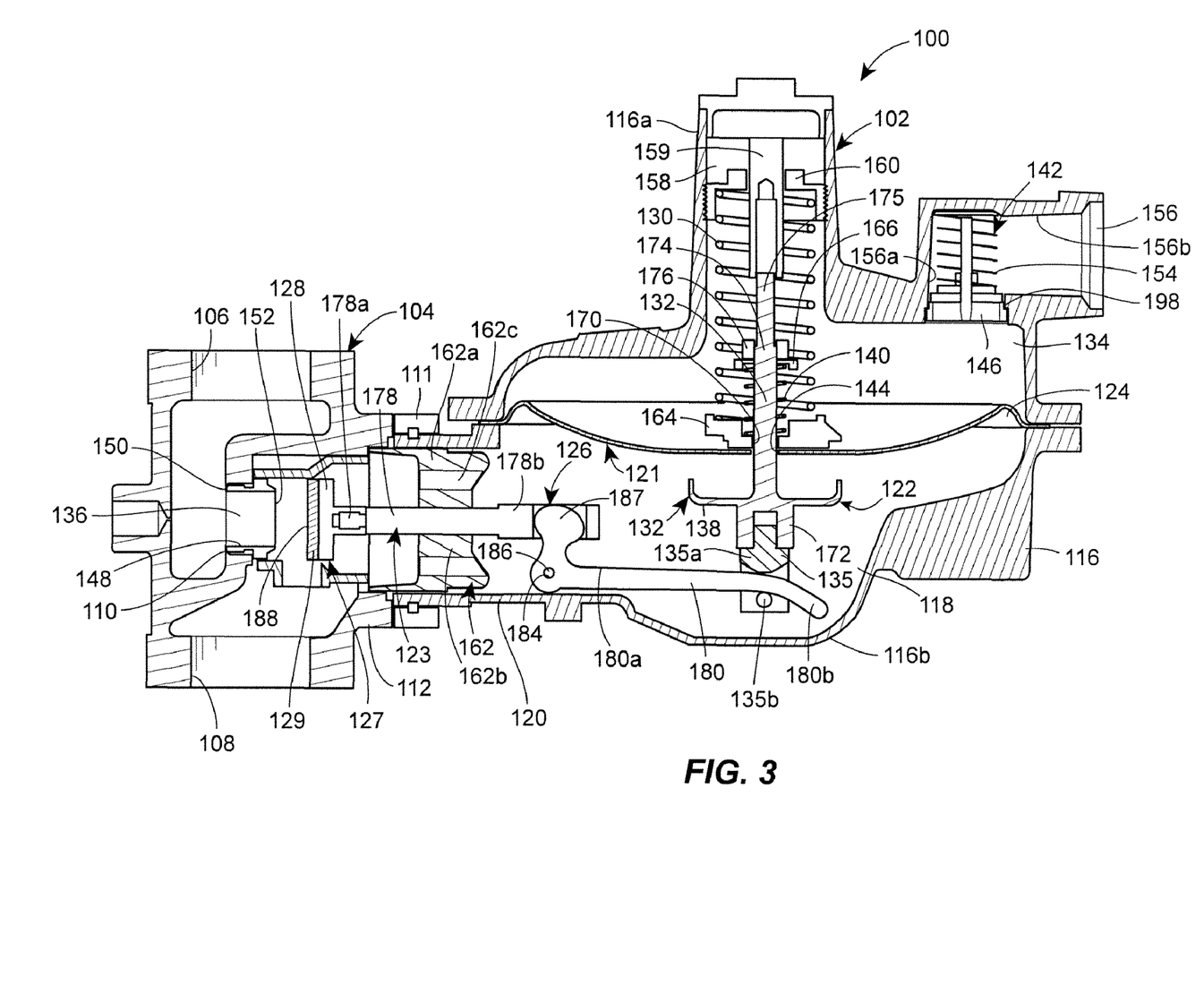
FIG. 3 is a side cross-sectional view of the regulator of FIG. 2 showing the valve disc in a normal operating position.

FIGS. 2 and 3 depict a gas regulator 100 constructed in accordance with one embodiment of the present invention. The gas regulator 100 generally comprises an actuator 102 and a regulator valve 104. The regulator valve 104 includes an inlet 106 for receiving gas from a gas distribution system, for example, and an outlet 108 for delivering gas to a facility having one or more appliances, for example. The actuator 102 is coupled to the regulator valve 104 and includes a control assembly 122 having a control element 127. During a first or normal operational mode, the control assembly 122 senses the pressure at the outlet 108 of the regulator valve 104, i.e., the outlet pressure, and controls a position of the control element 127 such that the outlet pressure approximately equals a predetermined control pressure. Additionally, upon the occurrence of a failure in the system, the regulator 100 performs a relief function that is generally similar to the relief function described above with reference to the regulator 10 depicted in FIGS. 1 and 1A.

With continued reference to FIG. 2, the regulator valve 104 defines a throat 110 and a valve mouth 112. The throat 110 is disposed between the inlet 106 and the outlet 108. A valve port 136 is disposed in the throat 110 and defines a bore 148 having an inlet 150 and an outlet 152. Gas must travel through the bore 148 in the valve port 136 to travel between the inlet 106 and the outlet 108 of the regulator valve 104. The valve port 136 is removable from the regulator valve 104 such that it may be replaced with a different valve port having a bore of a different diameter or configuration to tailor operational and flow characteristics of the regulator valve 104 to a specific application. In the disclosed embodiment, the valve mouth 112 defines an opening 114 (shown in FIGS. 3A and 4) disposed along an axis that is generally perpendicular to an axis of the inlet 106 and outlet 108 of the regulator valve 104.

The actuator 102 includes a housing 116 and the control assembly 122, as mentioned above. The housing 116 includes an upper housing component 116a and a lower housing component 116b secured together with a plurality of fasteners, for example. The lower housing component 116b defines a control cavity 118 and an actuator mouth 120. The actuator mouth 120 is connected to the valve mouth 112 of the regulator valve 104 to provide fluid communication between the actuator 102 and the regulator valve 104. In the disclosed embodiment, the regulator 100 includes a collar 111 securing the mouths 112, 120 together. The upper housing component 116a defines a relief cavity 134 and an exhaust port 156. The upper housing component 116a further defines a tower portion 158 for accommodating a portion of the control assembly 122, as will be described.

The control assembly 122 includes a diaphragm subassembly 121, a disc subassembly 123, and a release valve 142. The diaphragm subassembly 121 includes a diaphragm 124, a piston 132, a control spring 130, a relief spring 140, a combination spring seat 164, a relief spring seat 166, a control spring seat 160, and a piston guide 159.

More particularly, the diaphragm 124 includes a disc-shaped diaphragm defining an opening 144 through a central portion thereof. The diaphragm 124 is constructed of a flexible, substantially air-tight, material and its periphery is sealingly secured between the upper and lower housing components 116a, 116b of the housing 116. The diaphragm 124 therefore separates the relief cavity 134 from the control cavity 118.

The combination spring seat 164 is disposed on top of the diaphragm 124 and defines an opening 170 disposed concentric with the opening 144 in the diaphragm 124. As depicted in FIG. 2, the combination spring seat 164 supports the control spring 130 and the relief spring 140.

The piston 132 of the disclosed embodiment includes a generally elongated rod-shaped member having a sealing cup portion 138, a yoke 172, a threaded portion 174, and a guide portion 175. The sealing cup portion 138 is concaved and generally disc-shaped and extends circumferentially about a mid-portion of the piston 132, and is located just below the diaphragm 124. The yoke 172 includes a cavity adapted to accommodate a coupler 135 which connects to a portion of the disc subassembly 123 to enable attachment between the diaphragm subassembly 121 and the disc subassembly 123, as will be described.

The guide portion 175 and the threaded portion 174 of the piston 132 are disposed through the openings 144, 170 in the diaphragm 124 and the combination spring seat 164, respectively. The guide portion 175 of the piston 132 is slidably disposed in a cavity in the piston guide 159, which maintains the axial alignment of the piston 132 relative to the remainder of the control assembly 122. The relief spring 140, the relief spring seat 166, and a nut 176, are disposed on the threaded portion 174 of the piston 132. The nut 176 retains the relief spring 140 between the combination spring seat 164 and the relief spring seat 166. The control spring 130 is disposed on top of the combination spring seat 164, as mentioned, and within the tower portion 158 of the upper housing component 116a. The control spring seat 160 is threaded into the tower portion 158 and compresses the control spring 130 against the combination spring seat 164. In the disclosed embodiment, the control spring 130 and the relief spring 140 include compression coil springs. Accordingly, the control spring 130 is grounded against the upper housing component 116a and applies a downward force to the combination spring seat 164 and the diaphragm 124. The relief spring 140 is grounded against the combination spring seat 164 and applies an upward force to the relief spring seat 166, which in turn is applied to the piston 132. In the disclosed embodiment, the force generated by the control spring 130 is adjustable by adjusting the position of the control spring seat 160 in the tower portion 158, and therefore the control pressure of the regulator 100 is also adjustable.

The control spring 130 acts against the pressure in the control cavity 118, which is sensed by the diaphragm 124. As stated, this pressure is the same pressure as that which exists at the outlet 108 of the regulator valve 104. Accordingly, the force applied by the control spring 130 sets the outlet pressure to a desired, or control pressure for the regulator 100. The diaphragm subassembly 121 is operably coupled to the disc subassembly 123, as mentioned above, via the yoke portion 172 of the piston 132 and the coupler 135.

Specifically, the disc subassembly 123 includes a control arm 126 and a stem guide 162. The control arm 126 includes a stem 178, a lever 180, and the control element 127. The control element 127 of the disclosed embodiment includes a valve disc 128. Additionally, in the disclosed embodiment, the valve disc 128 includes a sealing disc 129 for sealing against the valve port 136 as depicted in FIG. 2. The sealing disc 129 may be attached to the remainder of the valve disc 128 with adhesive, for example, or some other means. The sealing disc 129 may be constructed of the same material or a different material than remainder of the valve disc 128. For example, in one embodiment, the sealing disc 129 may include a polymer sealing disc 129.

The stem 178, lever 180, and valve disc 128 are constructed separately and assembled to form the control arm 126. Specifically, the stem 178 is a generally linear rod having a nose 178a and a recess 178b, which in the disclosed embodiment is generally rectangular. The lever 180 is a slightly curved rod and includes a fulcrum end 180a and a free end 180b. The fulcrum end 180a includes an aperture 184 receiving a pivot pin 186 carried by the lower housing component 116b. The fulcrum end 180a also includes a knuckle 187 having an elliptical cross-section and disposed within the recess 178b of the stem 178. The free end 180b is received between a top portion 135a and a pin 135b of the coupler 135 that is attached to the yoke 172 of the piston 132. Thus, the coupler 135 operably connects the disc subassembly 123 to the diaphragm subassembly 121.

The stem guide 162 includes a generally cylindrical outer portion 162a, a generally cylindrical inner portion 162b, and a plurality of radial webs 162c connecting the inner and outer portions 162b, 162a. The outer portion 162a of the stem guide 162 is sized and configured to fit within the mouths 112, 120 of the regulator valve 104 and lower housing component 116b, respectively. The inner portion 162b is sized and configured to slidably retain the stem 178 of the control arm 126. Thus, the stem guide 162 serves to maintain the alignment of the regulator valve 104, the actuator housing 116, and the control assembly 122, and more particularly, the stem 178 of the control arm 126 of the control assembly 122.

Figure 3A:
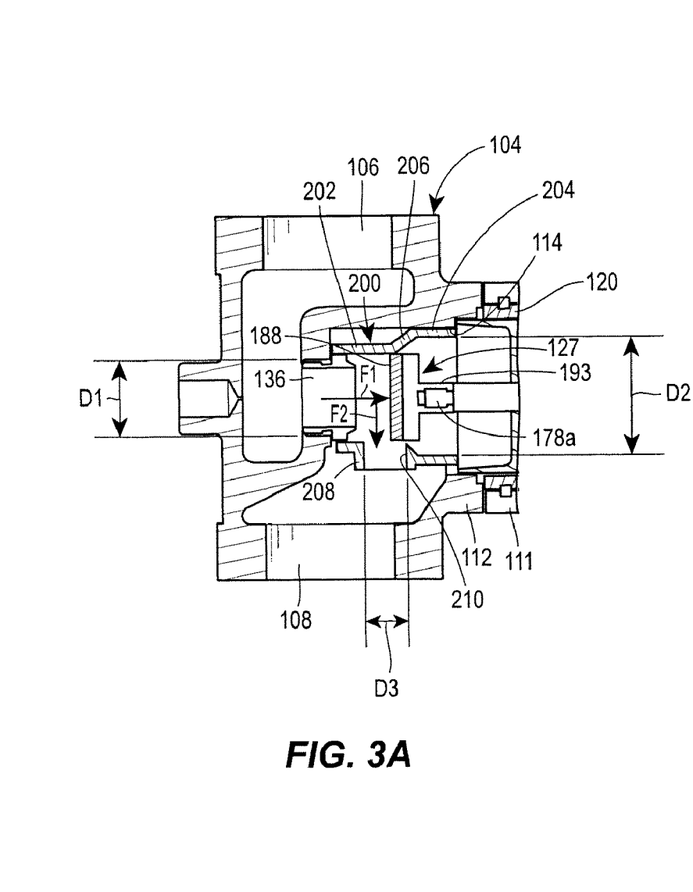
FIG. 3A is a side cross-sectional view of the regulator valve of the regulator of FIG. 3.
Figure 4:
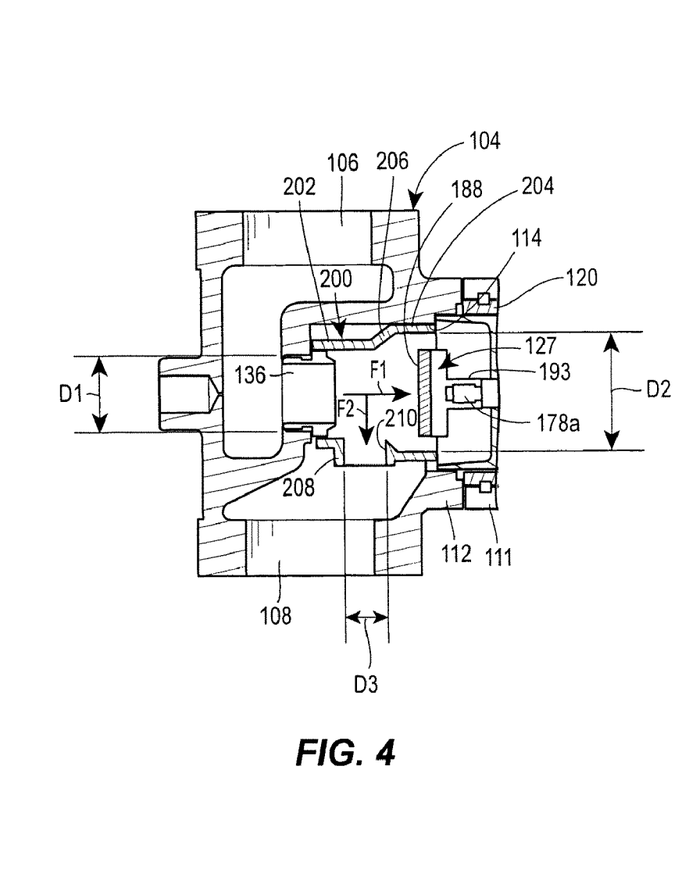
FIG. 4 is a side cross-sectional view of the regulator valve of the regulator of FIGS. 2 and 3 showing the regulator valve in a full open position.

With reference to FIGS. 3A and 4, the valve disc 128 of the control element 127 includes a collar 193 adapted to snap-fit onto the nose 178a of the stem 178. The valve disc 128 has a sealing surface 188. In the disclosed embodiment, the sealing disc 129 carries the sealing surface 188.

With continued reference to FIGS. 3A and 4, the present embodiment of the regulator 100 includes a cartridge 200 disposed within the regulator valve 104. The cartridge 200 includes a first portion 202, a second portion 204, a transition portion 206, and a conduit portion 208. The first and second portions 202, 204 are generally cylindrical and axially aligned. The first portion 202 has an inner diameter D1 that is sized and configured to receive the valve disc 128 of the control assembly 122 within generally tight tolerances. In one embodiment, the valve disc 128 can be slidably received within the first portion 202 of the cartridge 200. As used herein, the term "slidably received" does not necessarily require the valve disc 128 to contact the inner diameter D1 of the first portion 202, but rather, it is intended to include all variations where there is no contact, or alternatively only periodic contact, slight contact, etc., between the valve disc 128 and the first portion 202. Nonetheless, when the valve disc 128 is slidably received within the first portion 202, only a very small proportion of the fluid traveling through the valve port 136 is allowed to pass between the valve disc 128 and the cartridge 200. The valve disc 128 effectively serves to block, restrict, or substantially prevent the flow of fluid to the actuator 102. The second portion 204 has an inner diameter D2 that is greater than the inner diameter D1 of the first portion 202, and as such, the valve disc 128 is not slidably received in the second portion 204.

The transition portion 206 is disposed axially between the first and second portions 202, 204. The transition portion 206 is also axially aligned with the first and second portions 202, 204. Moreover, the transition portion 206 of the disclosed embodiment is generally frustoconical, which can otherwise be described as tapered, and converges from the second portion 204 toward the first portion 202.

In the disclosed embodiment, the first portion 202 of the cartridge 200 defines an aperture 210 through a sidewall thereof. Thus, the conduit portion 208 is disposed adjacent to the aperture 210 and extends away from the remainder of the cartridge 200. The aperture 210 and the conduit portion 208 are approximately equal in diameter, which is indicated as D3 in FIGS. 3A and 4. In the disclosed embodiment, the diameter D3 of the aperture 210 and conduit portion 208 is smaller than both the diameters D1, D2 of the first and second portions 202, 204 of the cartridge 200, respectively.

As depicted, the second portion 204 of the cartridge 200 is disposed within the mouth 112 of the regulator valve 104. More specifically, an outer cylindrical surface of the second portion 204 of the cartridge 200 is in contact with the opening 114 of the mouth 112. Thus, the cartridge 200 may be removably disposed within the regulator valve 104 such that it may be interchanged with a different cartridge or the regulator 100 may be operated without a cartridge at all.

With the cartridge 200 installed, as depicted, the first, second, and transition portions 202, 204, 206 define a first flow path in a direction indicated by arrow F1 between the valve port 136 and the mouth 112 of the regulator valve 104. Furthermore, the aperture 210 and conduit portion 208 of the cartridge 200 define a second flow path in a direction indicated by arrow F2 between the valve port 136 and the outlet 108 of the regulator valve 104. In the disclosed embodiment, the first and second flow paths F1, F2 are perpendicular to each other.

FIG. 2 depicts the regulator 100 of the present embodiment with the control element 27 in a closed position. Therefore, the control element 127 is slidably disposed within the first portion 202 of the cartridge 200 such that the sealing surface 188 sealingly engages the outlet 152 of the valve port 136. So configured, gas does not flow through the valve port 136 and the regulator valve 104. This configuration is achieved because the outlet pressure, which corresponds to the pressure in the control cavity 118 of the housing 116 and sensed by the diaphragm 124, is greater than the force applied by the control spring 130. Accordingly, the outlet pressure forces the diaphragm 124 and the piston 132 into the closed position.

However, in the event that an operating demand is placed on the gas distribution system, e.g., a user begins operating an appliance such as a furnace, a stove, etc., the appliance draws gas flow from the control cavity 118 of the regulator 100, thereby reducing the pressure that is sensed by the diaphragm 124. As the pressure sensed by the diaphragm 124 decreases, a force imbalance occurs between a control spring force and an outlet pressure force on the diaphragm 124 such that the control spring 130 expands and displaces the diaphragm 124 and piston 132 downward, relative to the housing 116. This causes the lever 180 to pivot in the clockwise direction about the pivot pin 186, which, in turn, rotates the knuckle 187 relative to the recess 178b in the stem 178. This moves the stem 178 and the control element 127 away from the outlet 152 of the valve port 136 to open the regulator valve 104.

FIGS. 3 and 3A depict the diaphragm subassembly 121 including the control element 127 in one example of a normal operating position. Specifically, the control element 127 is moved away from the valve port 36 and into the region of the aperture 210 in the cartridge 200. The control element 127, however, remains, at least partially, within the first portion 202 of the cartridge 200.

So configured, the gas distribution system is able to deliver gas to the downstream appliance through the regulator valve 104 at a control pressure that is set by the control spring 130. Additionally, the diaphragm subassembly 121 continues to sense the outlet pressure of the regulator valve 104. As long as the outlet pressure remains approximately equal to the control pressure, the control assembly 122 will keep the control element 127 in this same general position. However, if the outlet flow, i.e., the demand, decreases, thereby increasing the outlet pressure above the control pressure set by the control spring 130, the diaphragm 124 senses the increased outlet pressure and moves upward against the bias of the control spring 130. Alternatively, if the outlet flow, i.e., the demand, increases, thereby decreasing the outlet pressure below the control pressure, the diaphragm 124 senses the decreased outlet pressure and the spring 130 biases the diaphragm 124 and piston 132 downward to open the regulator valve 104. Thus, slight deviations from the outlet or control pressure causes the control assembly 122 to react and adjust the position of the control element 127.

As the control spring 130 expands to displace the control element 127 and open the valve port 136, the force it generates reduces and the area of the diaphragm 124 increases. In the conventional regulator 10 described above with reference to FIGS. 1 and 1A, this reduction in spring force and increased diaphragm area, reduces the amount of outlet pressure required to balance the diaphragm 24, thereby resulting in the diaphragm 24 sensing a pressure that is lower than the actual outlet pressure. This, in turn, causes the control assembly 22 to open the valve port 36 even further, which reduces the outlet pressure of the regulator valve 14 below the control pressure. As stated above, this phenomenon is known as "droop."

However, the regulator valve 104 of the disclosed embodiment includes the cartridge 200. The cartridge 200 is configured to reduce "droop" by introducing a "boost" to the system. Specifically, as stated above, during a first operating mode or condition, the control element 127 is positioned within the first portion 202 of the cartridge 200, as depicted in FIGS. 3 and 3A. In this position, because the diameter of the control element 127 is only slightly smaller than the diameter D1 of the first portion 202 of the cartridge 200, the control element 127 and the cartridge 200 substantially close the opening 114 in the mouth 112 to prevent the flow of gas through the mouth 112 and into the actuator 102. Rather, the first portion 202 of the cartridge 200 and control element 127 direct the flow of gas toward the aperture 210 and conduit portion 208 of the cartridge 200 and ultimately to the outlet 108 of the regulator valve 104. So configured, it should be appreciated that the cartridge 200 may artificially induce a lower pressure or false pressure registration at the diaphragm 124 due to the restriction presented by the first portion 202 of the cartridge 200. The lower sensed pressure at the diaphragm 124 causes the control spring 130 to bias the diaphragm 124 downward, which will further open the valve port 136. This will increase the flow of gas through the valve 104 to the outlet 108 and increase the outlet control pressure. Accordingly, the cartridge 200 of the disclosed embodiment of the present invention provides for a "boost" to compensate for the "droop" that would otherwise occur.

In the event that a failure in the system occurs, the cartridge 200 of the disclosed embodiment does not affect the relief function of the regulator 100. Rather, as depicted in FIG. 4, in a second or failure operating mode, the control element 127 moves fully into the second portion 204 of the cartridge 200 to provide pressure relief to the regulator 100. The second portion 204 includes a larger diameter than the first portion 202 of the cartridge 200, as well as the control element 127. Therefore, gas flows through the second portion 204 of the cartridge 200 and around the control element 127 to the actuator 102. The larger diameter of the second portion 204 provides a substantially unrestricted flow to the actuator to create pressure registration at the diaphragm 124 substantially equal to the outlet pressure of the valve 104. Accordingly, this moves the piston 132 and sealing cup 138 into an extreme downward position. So configured, the larger dimension of the second portion 204 of the cartridge 200 minimizes the restriction that the control element 127 creates with the flow while in the position depicted in FIG. 3A, for example, to provide pressure relief at the outlet 108 of the regulator valve 104 as predetermined by the configuration of the relief valve 142.

For example, once the pressure in the control cavity 118 rises above a relief pressure, which is set by the relief spring 140, the pressure will force the diaphragm 124 and combination spring seat 164 upward, thereby compressing the relief spring 140 against the relief spring seat 166. This, in turn, disengages the diaphragm 124 from the sealing cup 138 of the piston 132 and allows gas to flow through the openings 144, 170 and into the relief cavity 134 above the diaphragm 124. As the relief cavity 134 fills with gas, its pressure increases.

Upon the pressure in the relief cavity 134 rising above a predetermined release pressure, the release valve 142 opens and exhausts gas through the exhaust port 156 to the atmosphere in a manner similar to that which is described above with reference to the conventional regulator 10 depicted in FIG. 1. Specifically, the release valve 142 includes a valve plug 146 and a release spring 154, as depicted in FIGS. 2 and 3. The release valve 142 is contained within the upper housing component 116a of the housing 116 adjacent to the exhaust port 156. More particularly, the exhaust port 156 includes an L-shaped cavity comprising a vertical portion 156a and a horizontal portion 156b. The vertical portion 156a is in fluid communication with the relief cavity 134. The horizontal portion 156b is open to the atmosphere. The vertical portion 156a contains the release valve 142 and defines a seating surface 198. The release spring 154 therefore biases the valve plug 146 into a closed position against the seating surface 198 of the exhaust port 156.

Based on the foregoing, a regulator and/or cartridge constructed in accordance with the present invention advantageously compensates for or prevents "droop" from occurring by directing the flow of gas through the valve port 136 toward the outlet 108 of the regulator valve 104 without adversely affecting the performance of pressure relief within the regulator 100. Moreover, a plurality of interchangeable cartridges may advantageously provide for the ability to tune the regulator 100 for a variety of specific applications. For example, each of the interchangeable cartridges may be configured to have different dimensions for the first portions, second portions, and/or the apertures and conduit portions. Thus, the invention is not limited to the regulator 100 and/or the cartridge 200 described herein, but rather, it is intended to include variations and alternative configurations that fall within the scope and spirit of the following claims.

Figure 5:
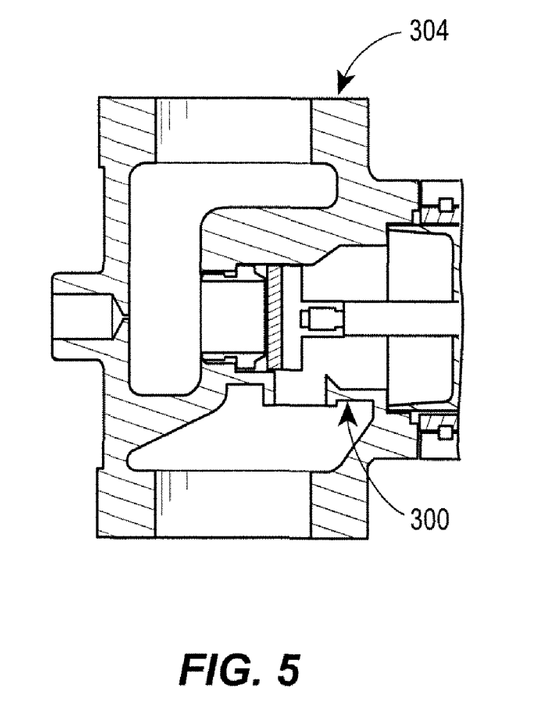
FIG. 5 is a side cross-sectional view of a regulator valve of the regulator of FIGS. 2 and 3 constructed in accordance with an alternative embodiment of the present invention.

For example, while the cartridge 200 disclosed herein with reference to FIGS. 2-4 has been described as being a component separate from the regulator valve 104, an alternative embodiment of a regulator valve 304 may include an integral cartridge portion 300 such as that depicted in FIG. 5, wherein the regulator valve 304 and cartridge portion 300 are constructed as one piece. That is, the cartridge portion 300 is integral with the regulator valve 304. The regulator valve 304 depicted in FIG. 5 is similar to the regulator valve 104 described above with the exception that it includes the integral cartridge portion 300 formed therewith. Thus, the integral cartridge portion 300 is generally identical to the cartridge 200 described above, and therefore provides the same advantages in combination with the control element 127 to reduce "droop" via creating "boost."

Figure 6:
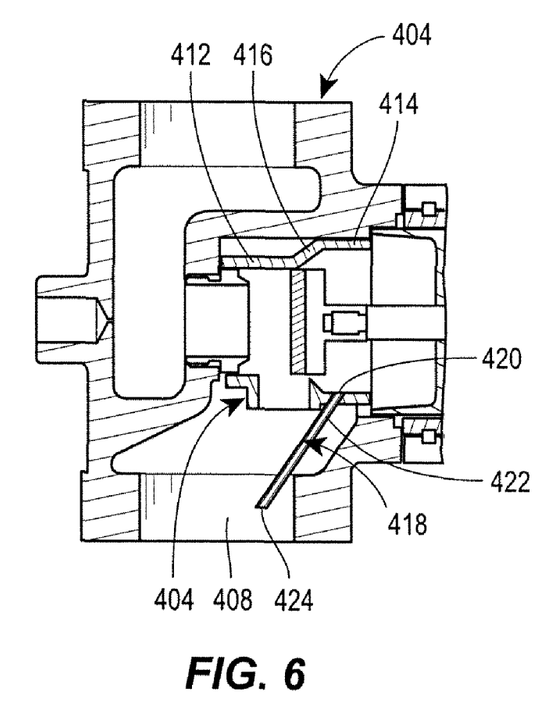
FIG. 6 is a side cross-sectional view of a regulator valve of the regulator of FIGS. 2 and 3 constructed in accordance with another alternative embodiment of the present invention.

Furthermore, while the regulator 100 has thus far been described as utilizing only a cartridge to reduce "droop" by introducing "boost," alternative embodiments of the regulator 100 can incorporate additional means for assisting with the introduction of "boost." For example, FIG. 6 depicts another alternative embodiment of a regulator valve 404 constructed in accordance with the principles of the present invention. The regulator valve 404 includes a cartridge 400 and a pitot tube 418. The cartridge 400 is similar to the cartridge 200 described above with reference to FIGS. 2-4 in that it includes a first portion 412, a second portion 414, and a transition portion 416 disposed between the first and second portions 412, 414. Additionally, the second portion 414 defines an aperture 420 disposed in a sidewall thereof. The aperture 420 in the second portion 414 of the cartridge 400 accommodates the pitot tube 418. For example, the pitot tube 418 includes a first end 422 and a detection end 424. The first end 422 is disposed within the aperture 420 in the second portion 414 of the cartridge 400. The detection end 424 is disposed downstream of the cartridge 400, and more particularly, adjacent the outlet 408 of the regulator valve 404. So configured, the pitot tube 418 of the embodiment disclosed in FIG. 6 senses the pressure adjacent to the outlet 408 and supplies it to the second portion 414 of the cartridge 400, which is then supplied to the actuator 102, and more particularly, the diaphragm 124 of the actuator 102 for controlling the control assembly 122.

Figure 7:
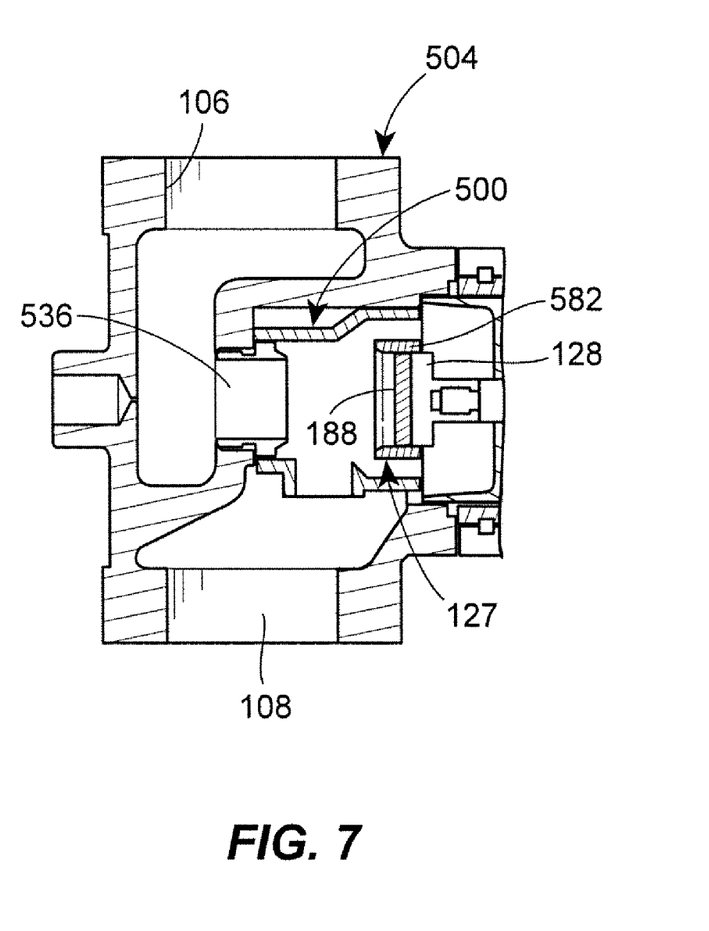
FIG. 7 is a side cross-sectional of a regulator valve of the regulator of FIGS. 2 and 3 constructed in accordance with still another alternative embodiment of the present invention.

FIG. 7 depicts yet another alternative embodiment of a regulator valve 504 for use with a regulator in accordance with the present invention. The regulator valve 504 includes a cartridge 500 similar to any of the cartridges 200, 300, 400 described above, and also includes a shroud 582 and a customized valve port 536 for introducing "boost." The regulator valve 504 and cartridge 500 are generally identical to the regulator valve 104 and cartridge 200 described above with reference to FIGS. 3 and 3A, and therefore like components will be identified with like reference numerals.

The shroud 582 extends about the periphery of and axially beyond the sealing surface 188 of the valve disc 128 such that when the control element 127 is in the normal operating position, as depicted, the shroud 582 assists the cartridge 500 in directing the flow of gas from the valve port 136 away from the diaphragm 124 and toward the outlet 108 of the regulator valve 504. So configured, it should be appreciated that the shroud 582 can also artificially induce a lower pressure or false pressure registration at the diaphragm 124 due to the restriction presented thereby. Accordingly, the shroud 582 of the disclosed embodiment complements the cartridge 500 to provide for a "boost" to compensate for the "droop" that can otherwise occur.

In one embodiment, the shroud 582 can be adjustably attached to the valve disc 128. Accordingly, the control element 127 may be tuned, for example, for different applications by adjusting the axial position of the shroud 582 relative thereto, which in turn adjusts the degree to which the shroud 582 extends beyond the sealing surface 188 and directs the flow of gas to the outlet 108 of the regulator valve 504. More specific details of the shroud 582 are disclosed in U.S. Provisional Patent Application No. 60/913,109, entitled "Adjustable Disc Mechanism for Gas Regulator," filed Apr. 20, 2007, the entire contents of which are hereby incorporated herein by reference.

Still referring to FIG. 7 and as mentioned, the depicted embodiment of the regulator valve 500 is equipped with a customized valve port 536. The customized valve port 536 is removable from the regulator valve 500 such that it can be replaced with a different valve port to optimize flow performance and efficiency for the desired application. For example, as disclosed in U.S. Provisional Patent Application No. 60/913,135, filed Apr. 20, 2007 and entitled, "Service Regulator with Improved Boost Performance," the entire contents of which are hereby expressly incorporated herein by reference, various valve ports constructed in accordance with the principles of the present invention are customized to include valve seats having specific seat heights to maximize the efficiency of the flow of gas from the valve ports and through the outlet of the regulator valve, for example. In one embodiment, the seat heights can be generally inversely proportional to the diameters of the orifices, or bores, through the valve ports. However, in alternative embodiments, the seat heights can be designed as a function of any other factor such as flow capacity of the particular valve port, desired outlet pressure, for example, or generally any other factor. So configured, valve ports with customized seat heights can be used to advantageously optimize flow performance, and more particularly, flow efficiency for different applications.

Based on the description of FIG. 7, it should be appreciated that the cartridge 500, the shroud 582, and the customized valve port 536, alone or in combination with each other or other components not expressly described herein, can be considered a "flow restrictor" in accordance with the present invention.

In light of the foregoing, it should be appreciated that the present invention provides an advantageous means of offsetting and/or preventing the effects of "droop" in gas regulators. However, the regulator 100 described herein is merely one example of a fluid control device incorporating the principles of the present invention. Other fluid control devices including other regulators and control valves may also benefit from the structures and/or advantages of the present invention.

What is claimed:

1. A fluid regulating device, comprising:
   a valve having an inlet, an outlet, and a throat disposed between the inlet and the outlet;
   an actuator coupled to the valve and comprising a valve disc, the valve disc disposed within the valve and adapted for displacement between a closed position adjacent to the throat, an operating position spaced a first distance away from the throat, and a relief position spaced a second distance away from the throat; and
   a cartridge disposed in the valve and comprising a cylindrical first portion disposed proximate to the throat, a cylindrical second portion disposed proximate to the actuator, an aperture disposed through a sidewall of the cylindrical first portion, and a conduit portion disposed proximate to the aperture, extending from the first portion and being disposed between the first portion and the outlet of the valve,
   the first portion of the cartridge having an inner dimension that is sized and configured to slidably receive at least a portion of the valve disc when the valve disc is in the operating position such that the valve disc and the cartridge cooperate to direct a flow of fluid from the throat to the outlet and away from the actuator.

2. The device of claim 1, wherein the first portion of the cartridge comprises a first diameter and the second portion of the cartridge comprises a second diameter that is greater than the first diameter.

3. The device of claim 2, wherein the valve disc is disposed in the second portion of the cartridge when the valve disc is in the relief position, thereby allowing fluid to flow through the second portion of the cartridge and into the actuator.

4. The device of claim 1, wherein the first portion slidably receives at least a portion of the valve disc when the valve disc is in the operating position.

5. The device of claim 1, wherein the conduit portion is disposed perpendicular to the first portion.

6. The device of claim 1, wherein the cartridge is removably disposed in the valve.

7. The device of claim 1, wherein the cartridge is integral with the valve.

8. The device of claim 1, further comprising a pitot tube including a detection end disposed adjacent the outlet of the valve for communicating a pressure at the outlet to the actuator.

9. The device of claim 1, further comprising a flow restrictor comprising at least one of the following flow restrictors:
   a shroud disposed about the periphery of the valve disc and extending axially toward the throat, and
   a valve port disposed within the throat of the valve and defining a bore and a valve seat, the bore adapted to allow fluid to flow through the valve, the valve seat adapted to be engaged by the valve disc when the valve disc is in the closed position,
   the flow restrictor, the cartridge, and the valve disc cooperating to direct the flow of fluid from the throat to the outlet and away from the actuator, when the valve disc is in the operating position.

10. A fluid regulating device, comprising:
   a valve having an inlet, an outlet, and a throat disposed between the inlet and the outlet;
   an actuator coupled to the valve and comprising a valve disc, the valve disc disposed within the valve and adapted for displacement between a closed position adjacent to the throat and an operating position spaced away from the throat; and
   a cartridge carried by the valve adjacent to the throat and comprising a first portion having a cylindrical sidewall, an aperture disposed through the cylindrical sidewall and located between the throat and the outlet of the valve, the cylindrical sidewall slidably receiving the valve disc when the valve disc is in the operating position, thereby substantially restricting a flow of fluid from the throat to the actuator and facilitating the flow of fluid from the throat to the outlet of the valve via the aperture,
   wherein the cartridge further comprises a second portion having a cylindrical sidewall, the second portion disposed adjacent to the actuator, and
   wherein the cylindrical sidewall of the first portion of the cartridge comprises a first diameter and the cylindrical sidewall of the second portion of the cartridge comprises a second diameter that is greater than the first diameter.

11. The device of claim 10, wherein the cartridge further comprises a tapered transition portion disposed between the first and second portions.

12. The device of claim 10, wherein the cartridge further comprises a conduit portion extending from the first portion adjacent to the aperture for facilitating the flow of fluid from the aperture toward the outlet of the valve.

13. The device of claim 10, wherein the cartridge is removably disposed within the valve.

14. The device of claim 10, wherein the cartridge is integral with the valve.

15. The device of claim 10, further comprising a pitot tube including a detection end disposed adjacent the outlet of the valve for communicating a pressure at the outlet to the actuator.

16. The device of claim 10, further comprising a flow restrictor comprising at least one of the following flow restrictors:
   a shroud disposed about the periphery of the valve disc and extending axially toward the valve port, and
   a valve port disposed within the throat of the valve and defining a bore and a valve seat, the bore adapted to allow fluid to flow through the valve, the valve seat adapted to be engaged by the valve disc when the valve disc is in the closed position,
   the flow restrictor, the cartridge, and the valve disc cooperate to direct the flow of fluid from the throat to the outlet and away from the actuator, when the valve disc is in the operating position.

17. A fluid regulating device, comprising:
   a valve having an inlet, an outlet, and a throat disposed between the inlet and the outlet;
   an actuator coupled to the valve and comprising a valve disc, the valve disc disposed within the valve and adapted for displacement between a closed position adjacent to the throat, an operating position spaced a first distance away from the throat, and a relief position spaced a second distance away from the throat;
   a cartridge disposed in the valve and comprising a cylindrical first portion disposed proximate to the throat, a cylindrical second portion disposed proximate to the actuator, an aperture disposed through a sidewall of the cylindrical first portion, and a conduit portion disposed proximate to the aperture, extending from the first portion and being disposed between the throat and the outlet of the valve, the first portion of the cartridge slidably receiving the valve disc when the valve disc is in the operating position; and
   a flow restrictor comprising at least one of the following flow restrictors:
      a shroud disposed about the periphery of the valve disc and extending axially toward the throat, and
      a valve port disposed within the throat of the valve and defining a bore and a valve seat, the bore adapted to allow fluid to flow through the valve, the valve seat adapted to be engaged by the valve disc when the valve disc is in the closed position,
   the flow restrictor, the cartridge, and the valve disc cooperating to direct a flow of fluid from the throat to the outlet of the valve and away from the actuator, when the valve disc is in the operating position.

18. The device of claim 17, wherein the first portion of the cartridge comprises a first diameter and the second portion of the cartridge comprises a second diameter that is greater than the first diameter.

19. The device of claim 17, wherein the valve disc is disposed in the second portion of the cartridge when the valve disc is in the relief position, thereby allowing fluid to flow through the second portion of the cartridge and into the actuator.

20. The device of claim 17, wherein the conduit portion is disposed perpendicular to the first portion.

21. The device of claim 17, wherein the cartridge is removably disposed in the valve.

22. The device of claim 17, wherein the cartridge is integral with the valve.

23. The device of claim 17, further comprising a pitot tube including a detection end disposed adjacent the outlet of the valve for communicating a pressure at the outlet to the actuator.

24. A fluid regulating device, comprising:
   a valve having an inlet, an outlet, and a throat disposed between the inlet and the outlet;
   an actuator coupled to the valve and comprising a valve disc, the valve disc disposed within the valve and adapted for displacement between a closed position adjacent to the throat, an operating position spaced a first distance away from the throat, and a relief position spaced a second distance away from the throat; and
   a cartridge disposed in the valve and comprising a generally cylindrical first portion disposed proximate to the throat, a generally cylindrical second portion disposed proximate to the actuator, and a conduit portion extending from the first portion and disposed between the first portion and the outlet of the valve,
   the first portion of the cartridge having an inner dimension that is sized and configured to slidably receive at least a portion of the valve disc when the valve disc is in the operating position such that the valve disc and the cartridge cooperate to direct a flow of fluid from the throat to the outlet and away from the actuator,
   wherein the first portion of the cartridge comprises a first diameter and the second portion of the cartridge comprises a second diameter that is greater than the first diameter, and
   wherein the valve disc is disposed in the second portion of the cartridge when the valve disc is in the relief position, thereby allowing fluid to flow through the second portion of the cartridge and into the actuator.

25. A fluid regulating device, comprising:
   a valve having an inlet, an outlet, and a throat disposed between the inlet and the outlet;
   an actuator coupled to the valve and comprising a valve disc, the valve disc disposed within the valve and adapted for displacement between a closed position adjacent to the throat, an operating position spaced a first distance away from the throat, and a relief position spaced a second distance away from the throat;
   a cartridge disposed in the valve and comprising a generally cylindrical first portion disposed proximate to the throat, a generally cylindrical second portion disposed proximate to the actuator, and a conduit portion extending from the first portion and disposed between the throat and the outlet of the valve, the first portion of the cartridge slidably receiving the valve disc when the valve disc is in the operating position; and
   a flow restrictor comprising at least one of the following flow restrictors:
      a shroud disposed about the periphery of the valve disc and extending axially toward the throat, and
      a valve port disposed within the throat of the valve and defining a bore and a valve seat, the bore adapted to allow fluid to flow through the valve, the valve seat adapted to be engaged by the valve disc when the valve disc is in the closed position,
   the flow restrictor, the cartridge, and the valve disc cooperating to direct a flow of fluid from the throat to the outlet of the valve and away from the actuator, when the valve disc is in the operating position,
   wherein the valve disc is disposed in the second portion of the cartridge when the valve disc is in the relief position, thereby allowing fluid to flow through the second portion of the cartridge and into the actuator.

26. A fluid regulating device, comprising:
a valve having an inlet, an outlet, and a throat disposed between the inlet and the outlet;
an actuator coupled to the valve and comprising a valve disc, the valve disc disposed within the valve and adapted for displacement between a closed position adjacent to the throat and an operating position spaced away from the throat; and
a cartridge carried by the valve adjacent to the throat and comprising a first portion having a cylindrical sidewall, an aperture disposed through the cylindrical sidewall and located between the throat and the outlet of the valve, the cylindrical sidewall slidably receiving the valve disc when the valve disc is in the operating position, thereby substantially restricting a flow of fluid from the throat to the actuator and facilitating the flow of fluid from the throat to the outlet of the valve via the aperture,
wherein the cartridge further comprises a second portion having a cylindrical sidewall, the second portion disposed adjacent to the actuator, and
wherein the cartridge further comprises a tapered transition portion disposed between the first and second portions.

27. The device of claim 26, wherein the cylindrical sidewall of the first portion of the cartridge comprises a first diameter and the cylindrical sidewall of the second portion of the cartridge comprises a second diameter that is greater than the first diameter.

28. The device of claim 26, wherein the cartridge further comprises a conduit portion extending from the first portion adjacent to the aperture for facilitating the flow of fluid from the aperture toward the outlet of the valve.

29. The device of claim 26, wherein the cartridge is removably disposed within the valve.

30. The device of claim 26, wherein the cartridge is integral with the valve.

31. The device of claim 26, further comprising a pitot tube including a detection end disposed adjacent the outlet of the valve for communicating a pressure at the outlet to the actuator.

32. The device of claim 26, further comprising a flow restrictor comprising at least one of the following flow restrictors:
a shroud disposed about the periphery of the valve disc and extending axially toward the valve port, and
a valve port disposed within the throat of the valve and defining a bore and a valve seat, the bore adapted to allow fluid to flow through the valve, the valve seat adapted to be engaged by the valve disc when the valve disc is in the closed position,
the flow restrictor, the cartridge, and the valve disc cooperate to direct the flow of fluid from the throat to the outlet and away from the actuator, when the valve disc is in the operating position.

* * * * *